(12) United States Patent
Caminita (10) Patent No.: US 7,540,452 B2
(45) Date of Patent: Jun. 2, 2009

(54) AIR DUCT SUPPORT

(76) Inventor: Anthony Frank Caminita, 1828 Carol Sue Ave., Gretna, LA (US) 70056

( * ) Notice: Subject to any disclaimer, the term of this patent is extended or adjusted under 35 U.S.C. 154(b) by 43 days.

(21) Appl. No.: 11/452,553

(22) Filed: Jun. 14, 2006

(65) Prior Publication Data

US 2006/0231689 A1    Oct. 19, 2006

Related U.S. Application Data

(63) Continuation-in-part of application No. 10/797,896, filed on Mar. 10, 2004, now abandoned.

(51) Int. Cl.
*E21F 17/02* (2006.01)
(52) U.S. Cl. .......................... 248/62; 248/49
(58) Field of Classification Search .............. 248/62, 248/74.1, 230.1, 230.6, 231.71, 316.1, 49, 248/58, 60, 65, 74.2, 230.8; 24/459, 481; 52/677, 678
See application file for complete search history.

(56) References Cited

U.S. PATENT DOCUMENTS

| | | | |
|---|---|---|---|
| 3,917,205 A * | 11/1975 | Meadors | 248/229.17 |
| 4,166,600 A | 9/1979 | Perjes | |
| 4,300,738 A | 11/1981 | Winfrey | |
| 4,413,799 A | 11/1983 | Gabriel | |
| 4,544,119 A | 10/1985 | Killett et al. | |
| 5,040,751 A * | 8/1991 | Holub | 248/62 |
| 5,221,064 A | 6/1993 | Hodges | |
| 5,303,885 A | 4/1994 | Wade | |
| 5,364,053 A | 11/1994 | Rodgers | |
| 5,746,401 A | 5/1998 | Condon | |
| 6,102,341 A | 8/2000 | Ball | |
| 2007/0089932 A1 * | 4/2007 | Boyett | 182/133 |

FOREIGN PATENT DOCUMENTS

GB    2062803 A  *  5/1981

* cited by examiner

*Primary Examiner*—A. Joseph Wujciak, III
(74) *Attorney, Agent, or Firm*—Keaty Professional Law Corporation (57) ABSTRACT

An air duct support for supporting air ducts and similar pipes without constricting airflow through the pipes. The support has an arcuate main body portion for receiving a portion of the conduit therein and an upright support attached to a bottom of the top portion and supporting the conduit at an elevated position in relation to a base surface. The support member may be a unitary body or telescopically extendable member. The top portion rotates 360 degrees in relation to the support member to accommodate any direction of extension of the conduit. A collar plate or a flexible strap may be positioned about an unsecured portion of the conduit to prevent displacement of the conduit in relation to the main body.

5 Claims, 14 Drawing Sheets

AIR DUCT SUPPORT

CROSS-REFERENCE TO RELATED APPLICATIONS

This application is a continuation-in-part of my co-pending application Ser. No. 10/797,896 filed on Mar. 10, 2004, now abandoned entitled "Duct Holder," the full disclosure of which is incorporated by reference herein, and priority of which is hereby claimed.

BACKGROUND OF THE INVENTION

The present invention relates to conduit supports and, more particularly, to a support or holder for supporting hollow conduits, such as air, heating ducts or pipes between adjacent joists of a building structure.

Conventionally, heating, cooling, ventilating and air conditioning systems (HVAC systems) in buildings use pipes, tubes, flexible ducts and other tubular bodies for conveying the air within the building. The tubular conduits are supported between floor or ceiling joists and normally secured in a suspended position by nylon straps or metal hangers that are placed between the joists. One problem with conventional duct supports is that the nylon straps or metal brackets have to be secured to a rafter, which in some cases is located at a relatively high level above a base surface, or floor of an attic. To reach the rafter, the worker has to climb a ladder or construct a special platform high enough to give access to the rafter. Naturally, such method of suspending the tubular conduits takes time and increases the cost of the labor involved in the construction of the building.

Another problem with the use of flexible straps is that they tend to constrict the airflow within a flexible duct. When the strap is tied to the rafter, it is estimated that about 25% of airflow may be lost due to the duct constriction. Still another problem associated with suspending the air ducts is that a condensate tends to form in the portion of the air duct that sagged between adjacent straps. The accumulated moisture drips into the insulation, where it can cause damage or facilitate development of mold and mildew around the duct.

The present invention contemplates elimination of drawbacks associated with conventional methods and provision of a duct support that can support the ducts or other tubular conduits from above or below the conduit without constricting the flow of gas or fluid through the conduit.

SUMMARY OF THE INVENTION

It is therefore, an object of the present invention to provide a duct support that can be used in place of conventional conduit supports in a building.

It is another object of the present invention to provide a duct support particularly adapted for use with air circulation systems wherein the conduits have to be supported at certain intervals along their lengths.

It is a further object of the present invention to provide an air duct support that can be secured to either a joist or rafter and effectively support the air duct without constricting the air flow through the air duct.

These and other objects of the present invention are achieved through a provision of a support device that allows the conduit to be elevated above a base surface, such as the attic floor, without constricting the air flow passing through the conduit. The support device has an arcuate main body and an upright support member, to which the main body is engaged in free rotational relationship. The main body defines an open channel for receiving a portion of a conduit therein. The channel is sized and shaped to accommodate different shape and diameter conduit, such as for instance air ducts. The upright support can be formed as an upright planar member or with a pair of spaced legs and allow positioning of the conduit at a desired height above a base surface.

To prevent displacement of the conduit, especially if the support device is mounted to a rafter and suspends the main body below the support member, is provided with a collar plate or a strap that wraps about an unsupported portion of the air duct. The device can be also secured to joists, allowing the main body to be oriented above the support member.

BRIEF DESCRIPTION OF THE DRAWINGS

Reference will not be made to the drawings, wherein like parts are designated by like numerals, and wherein.

DETAIL DESCRIPTION OF THE PREFERRED EMBODIMENTS

Figure 1:
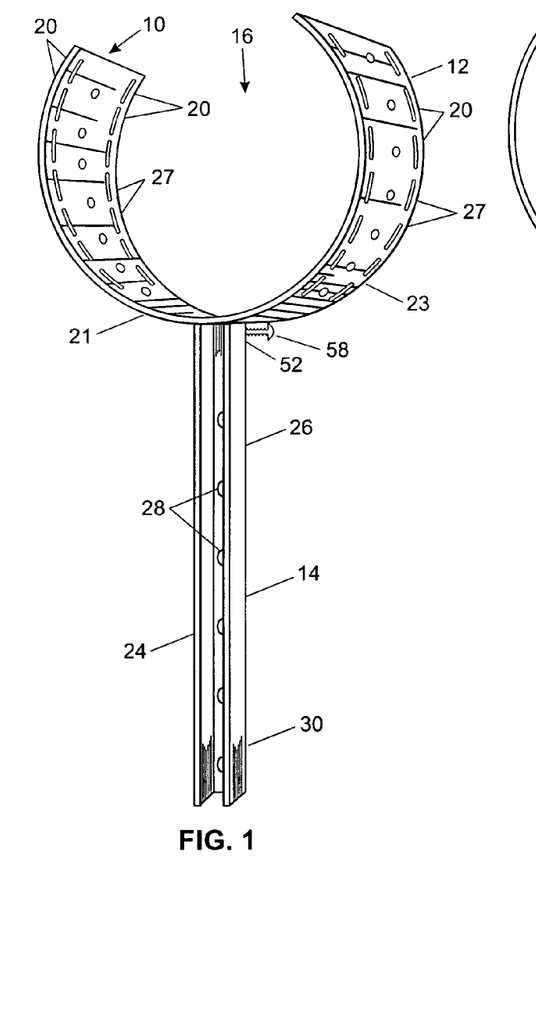
FIG. 1 is a perspective view of an air duct support in accordance with the first embodiment of present invention.
Figure 2:
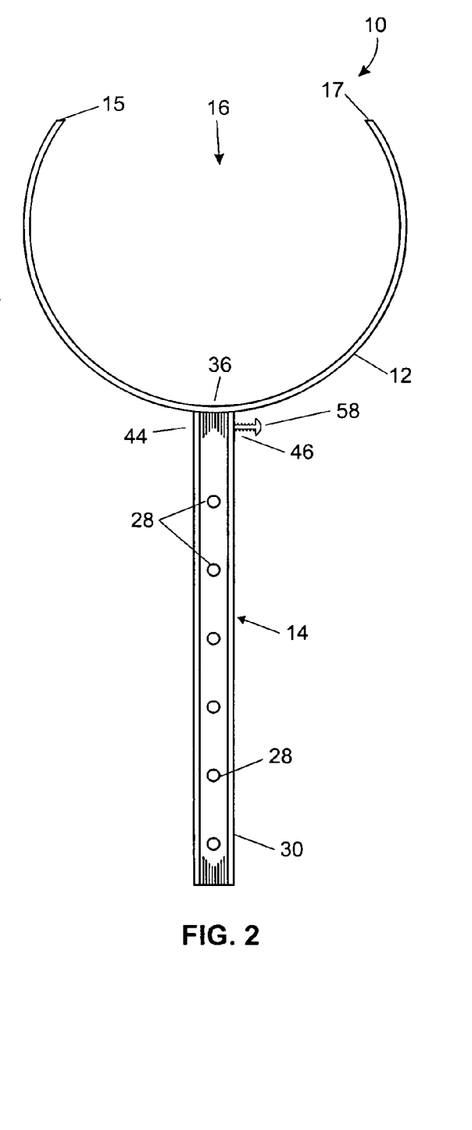
FIG. 2 is a front view of the duct holder of the first embodiment of the present invention.
Figure 3:
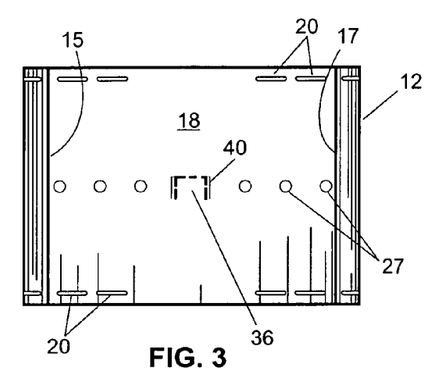
FIG. 3 is a top view of the duct support of the first embodiment of the present invention.
Figure 4:
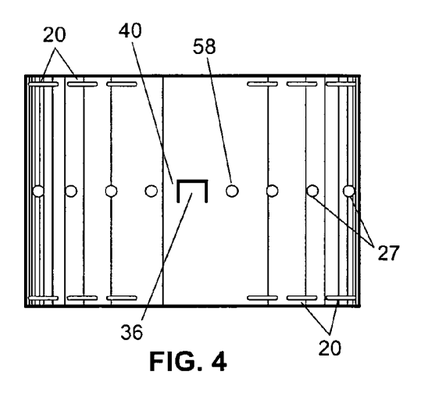
FIG. 4 is the bottom view of the duct holder of the first embodiment of the present invention.
Figure 5:
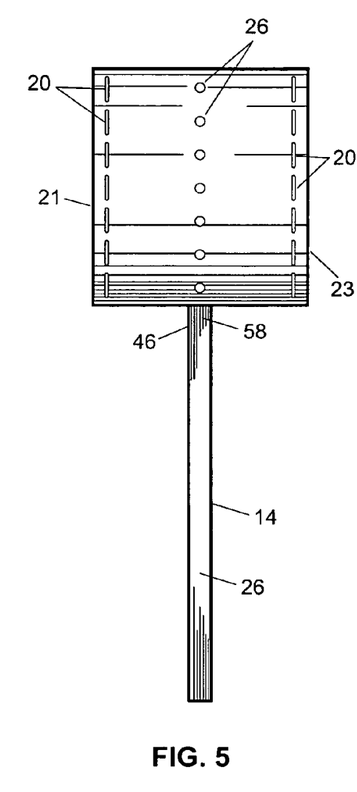
FIG. 5 is side view of the duct holder of the first embodiment of the present invention.
Figure 28A:
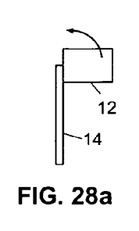
FIGS. 28a through 28f are schematic views illustrating a series of steps in preparing the air duct support of the instant invention for installation.

Turning now to the drawings in more detail, numeral 10 designates the air duct support unit in accordance with the first embodiment of the present invention. The air duct support 10 comprises a main body member 12 and an upright support member 14. The main body 12 has a generally arcuate body defining a generally C-shaped channel 16 for receiving a tubular conduit, such as an air duct 11 therethrough. The main body 12 has a bottom surface 18 and opposing ends 15 and 17. The main body 12 has a generally C-shaped cross-section so as to accommodate an air duct and extend somewhat along the sides of the conduit, as can be seen in FIG. 28. A rivet 36 secures the main body 12 to the upright support member 14, allowing the main body 12 to freely rotate in relation to the upright support 14.

The main body 12 is preferably formed of relatively rigid durable non-corrosive material, such as polypropylene, aluminum and other comparable material. The size and shape of the channel 16 formed by the main body 12 varies, depending on the exterior configuration of the duct to be supported by the support unit 10.

A plurality of elongated slots 20 is cut in the main body 12. The slots 20 extend along a first edge 21 and a second edge 23 of the main body 12 in parallel rows. The slots are spaced substantially equidistantly from each other along the length of the edges 21 and 23. A plurality of openings 27 is formed in the main body 27; the openings 27 are located centrally between the rows of the slots 20 and are spaced substantially equidistantly along the curvature of the main body 12.

The support member 14 is formed from a strong non-corrosive material capable of withstanding the weight of a section of the conduit, such as an air duct, resting within the channel 16 of the main body 12. The support member 14 has a generally U-shaped cross-section having a central wall 22 and a pair of parallel side walls 24 and 26, which are oriented substantially perpendicularly to the central wall 22. A plurality of spaced-apart openings 28 are formed along the length of the central wall 22, extending from the lower portion 30 to the upper portion 32 of the support member 14.

Figure 35:
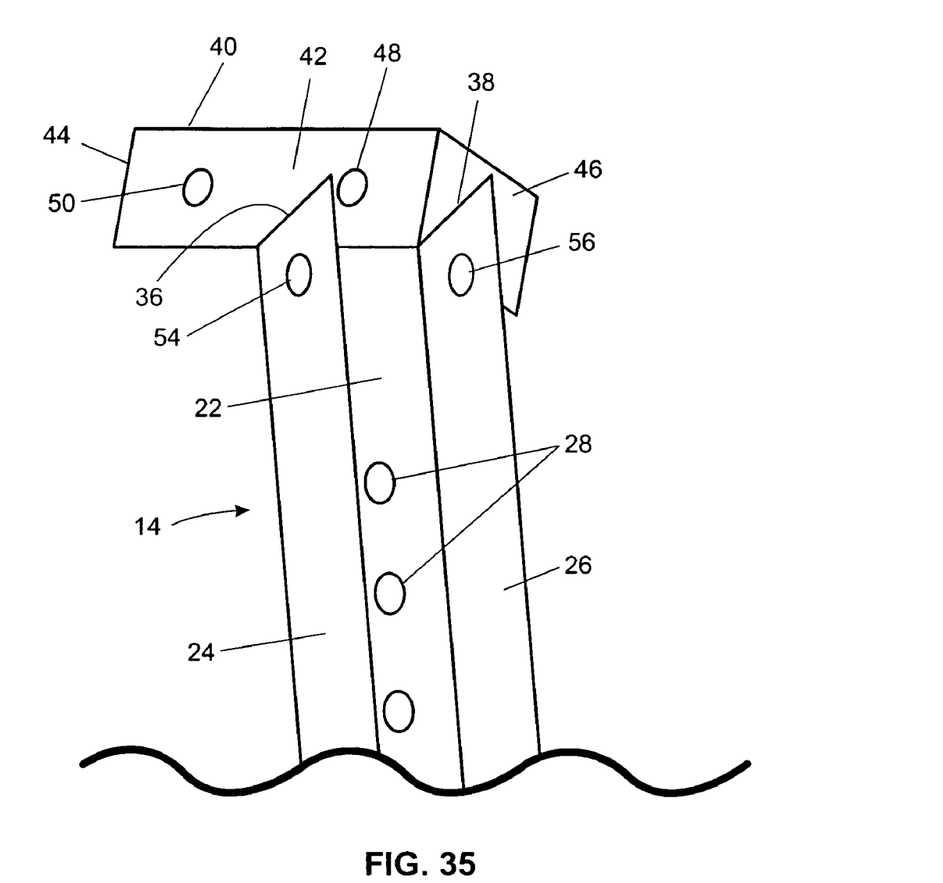
FIG. 35 is a detail view illustrating engagement of the upright support member with the securing plate.

The support member 14 is formed as a unitary body. A pair of cuts 36, 38 is made through the walls 24, 26 in the upper portion 32 (FIG. 35). An attachment bridge 40 is formed by the uppermost part of the support member 14. The attachment bridge 40 comprises a central portion 42, which has the same width as the central wall 22, and a pair of side tabs 34, 36, which have the same widths as the side walls 24, 26, respectively.

When the attachment bridge 40 is prepared for securing to the main body 12, the bridge 40 is bent at 90 degrees in relation to the central wall 22. A central opening 48 made in the attachment bridge 40 receives the rivet 36, allowing the main body 12 to freely rotate in relation to the upright support 14. An opening 50 is formed in a side tab 44, and a similar opening 52 is formed in the side tab 46.

Figure 28B:
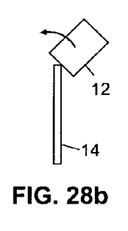
Figure 28C:
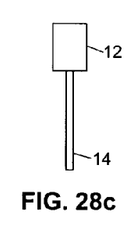
Figure 28D:
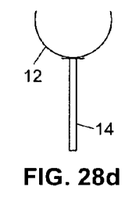
Figure 28E:
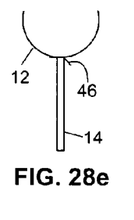

When preparing the support 10 for installation, first moves the main body 12 to orient the main body 12 above the support 14 (FIGS. 28a-28c). The main body 12 may be pivotally or hingedly attached to the support member 14, as shown in FIGS. 28a-28c. The user then bends down the bridge 40 and then the side tabs 44 and/or 46 (FIGS. 28d and 28e) at 90 degrees, so that the side tabs 44, 46 extend in a substantially parallel relationship to the side walls 24, 26, respectively. The rivet 36 is inserted through the opening made in the main body 12 and through the opening 48.

Figure 28F:
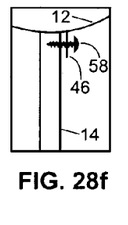

An opening 54 is made in the wall 24 and a similar opening 56 is made in the wall 26. A user aligns the opening 50 with the opening 54 in the wall 24, and/or aligns the opening 52 with the opening 56 in the wall 26. A user then inserts a retaining device, such as for instance a screw 58 (FIG. 28f) through the aligned openings 52, 56. An optional second retaining device may be inserted through the openings 50, 54. The support 14 is thereby made more stable and rigid.

Figure 11:
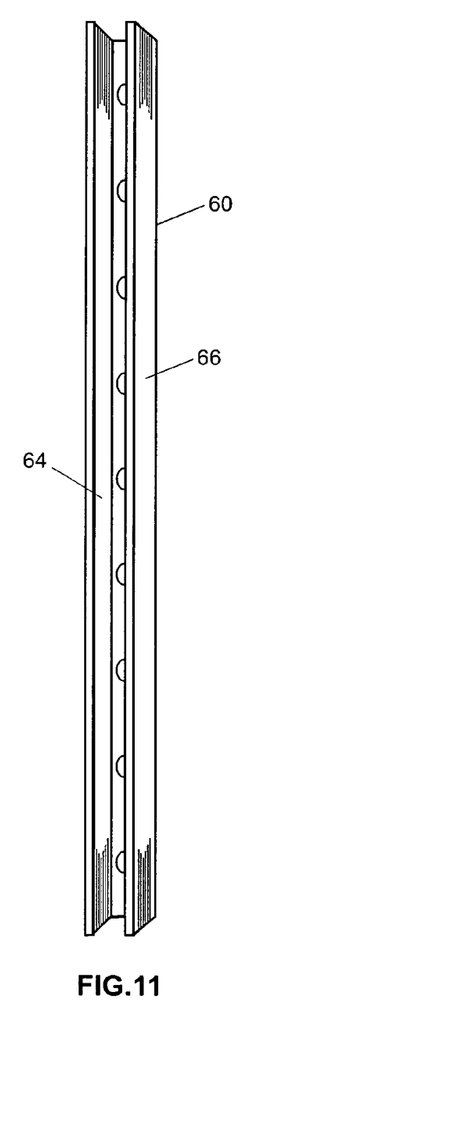
FIG. 11 is a perspective view of an optional upright support extension member for use with the air duct support of the first embodiment of the present invention.
Figure 12:
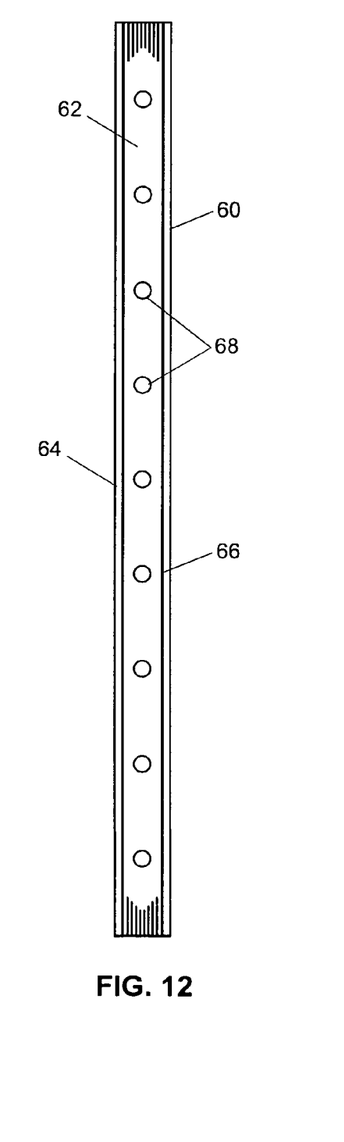
FIG. 12 is a front view of the optional upright support extension member of FIG. 11.

If necessary, an optional support extension member 60 can be added to extend the height of the upright member 14. The extension member 60 has the same U-shaped configuration as the support member 14, but smaller in size, so that the extension member 60 fits within the channel defined by the central wall 22 and the side walls 24, 26. As shown in detail in FIGS. 11 and 12, the extension member 60 has a central wall 62 and a pair of opposing parallel side walls 64, 66 (FIGS. 11 and 12).

Figure 29:
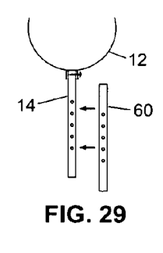
FIG. 29 is a schematic view illustrating securing of the optional upright support member.
Figure 30:
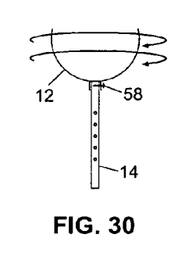
FIG. 30 is a schematic view illustrating free rotation capability of the arcuate support member in relation to the upright support member.

The central wall 62 is provided with a plurality of spaced openings 68 that are aligned in a manner similar to the openings 28 in the central wall 22. When the height extension of the upright support 14 is desired, the extension member 60 is fitted in the channel formed by the central wall 22 and the side walls 24, 26 of the support 14 (FIG. 29), and a retaining device, a screw, bolt, etc., is inserted through the aligned openings 28, 68.

Figure 13:
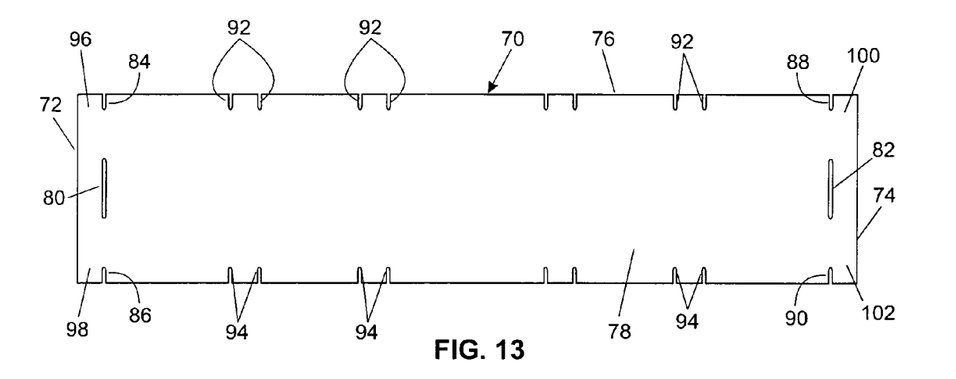
FIG. 13 is a top view of a collar plate member for use when using a rafter installation method.
Figure 14:
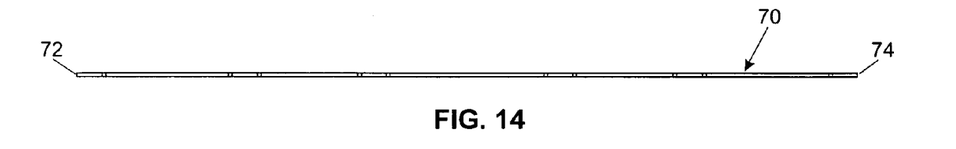
FIG. 14 is a side view of the collar plate member of FIG. 13.
Figure 15:
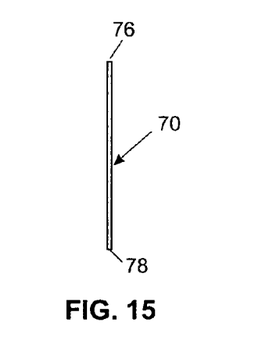
FIG. 15 is an end view of the collar plate member of FIGS. 13 and 14.

Turning now to FIG. 13-15, a collar plate 70 for use with the air duct support device of the present can be seen in more detail. The collar plate 70 comprises a planar body having a generally rectangular configuration with opposing parallel edges 72 and 74. Edges 76, 78 extend perpendicularly to the edges 72, 74. An elongated slot 80 is formed adjacent the edge 72, and an elongated slot 82 is formed adjacent the edge 74. The slots 80, 82 are adapted to receive a hook of the supporting strap, as will be explained in more detail hereinafter.

A pair of opposing notches 84, 86 is formed in the edge 76, 78, respectively adjacent the edge 72, and a similar pair of opposing notches 88, 90 is formed in the edges 76, 78 adjacent the edge 74. The notches 84, 86, 88, and 90 allow the user to form side tabs on the collar plate 70 for engagement with the main body 12. A plurality of spaced notches 92 is formed along the edge 76 between the notches 84 and 88. A plurality of opposing notches 94 is formed in the edge 78 between the notches 86, 90.

Figure 31A:
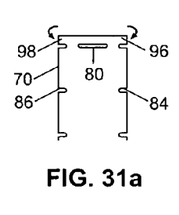
FIGS. 31a and 31b are schematic views illustrating preparation of the collar plate member for installation.
Figure 31B:
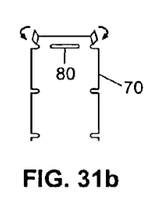
Figure 32A:
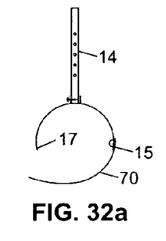
FIGS. 32a through 32c schematically illustrate a series of steps in securing the collar plate member to the arcuate support member.

Turning now to FIGS. 31a and 31b, a process of preparing the collar 70 for use is shown in more detail. The user bends the edges 76 and 78 to form side tabs 96, 98 and 100, 102, as shown by arrows in FIGS. 31a and 31b. After a conduit 11 is positioned in the channel 16, the user inserts the tabs 96, 98 in opposing slots 20 adjacent an end 15 of the main body 12. This step is schematically illustrated in FIG. 32a. The user then brings the collar 70 around the conduit 11 and secures the tabs 100, 102 in the opposing slots 20 near the end 17 of the main body 12.

Figure 32B:
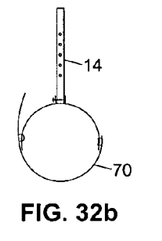
Figure 32C:
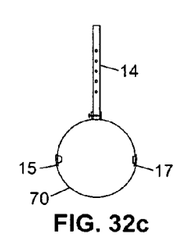

Should the collar 70 be too long, the user follows the steps schematically illustrated in FIGS. 32b and 32c: the user cuts the collar 70 along an imaginary line extending between the notches 92, 94 to conform the length of the collar 70 to the outside dimensions of the conduit 11. The excess length of the collar 70 is discarded, new side tabs 100, 102 are formed as described above, by bending along the notch lines 92, 94, and the new tabs are inserted in the notches 20 adjacent the end 17.

Figure 33:
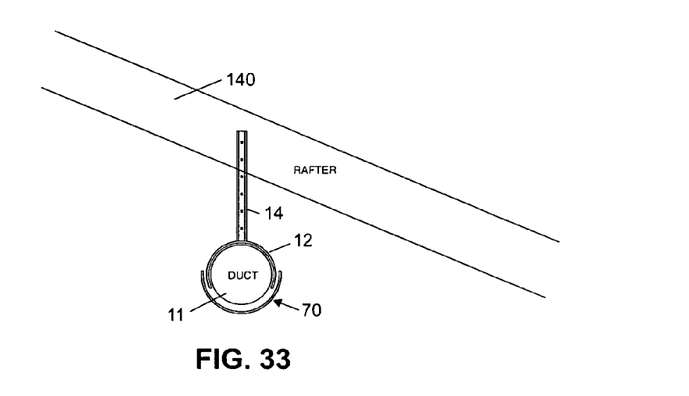
FIG. 33 is a schematic view illustrating a plurality of air duct support units of the present invention secured to a rafter.

The collar plate can be formed from a variety of materials, such as thin aluminum plate, thin steel plate and the like. The preferred material can be bended without breaking, is non-corrosive and strong enough to support the weight of the air duct in applications where the main body 12 is below the support member 14, such as when the device 10 is secured to a rafter (FIG. 33).

Some tests performed with the prototype of the present invention showed that the conduit 11 can vibrate and "rattle" when a strong air flow passes through the duct 11. To cure the problem, the instant invention provides for the use of a flexible strap 110, which is wrapped around the exposed portion of the conduit positioned in the channel 16. The strap 110 is shown is detail in FIGS. 16-22. The strap 110 comprises an elongated flexible body 112 having an inner surface 114, an outer surface 116, and opposing ends 118, 120. The flexible body 112 may be made from a stretchable, resilient material.

Figures 16, 17, 18:
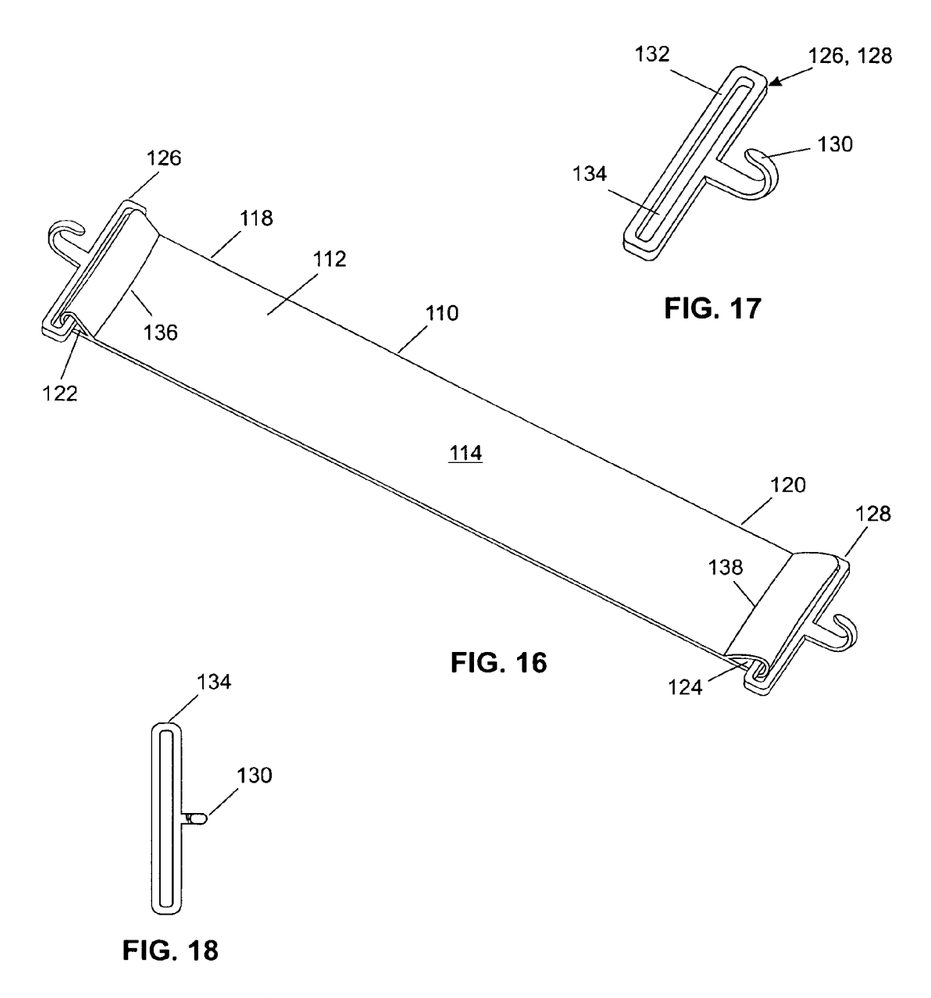
FIG. 16 is a perspective view of a supporting strap for use with the air duct support of the present invention.
FIG. 17 is a detail perspective view of a hook used in the supporting strap.
FIG. 18 is a detail top view of the hook used in the supporting strap.
Figure 19:
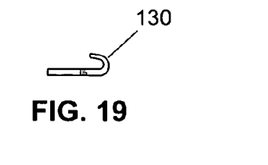
FIG. 19 is a detail side view of the hook used in the supporting strap.
Figure 20:
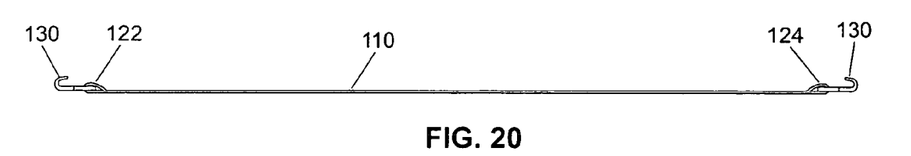
FIG. 20 is a side view of the supporting strap.
Figure 21:
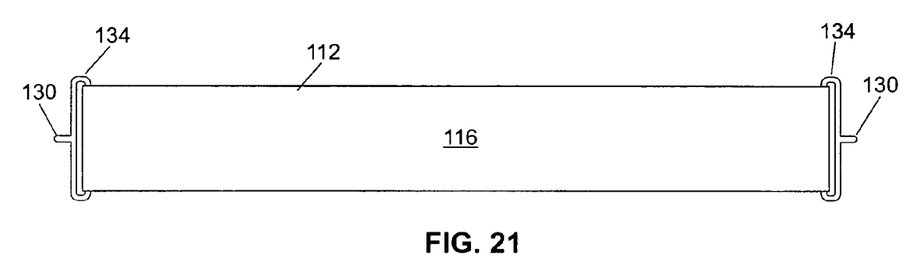
FIG. 21 is a bottom view of the supporting strap.
Figure 22:
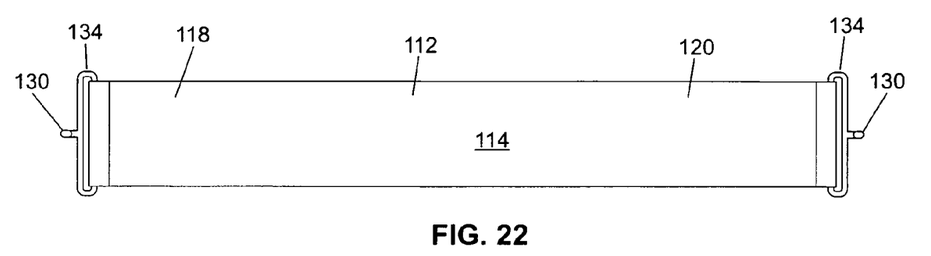
FIG. 22 is a top view of the supporting strap.

The strap end 118 is folded over to form an open fold 122, and the strap end 120 is folded over to form an open fold 124. A hook member 126 is secured in the fold 122, and a hook member 128 is positioned in the fold 124. The hook members 126 and 128 are identical; both have a hook portion 130 and an attachment part 132, which is configured as a rectangular frame with an opening 134. The strap ends 118, 120 are threaded through the opening 134 before folding over. The free ends of the strap 136, 138 are secured to the main body of the strap 112 by stitching, adhesive or any other suitable means.

Figure 23:
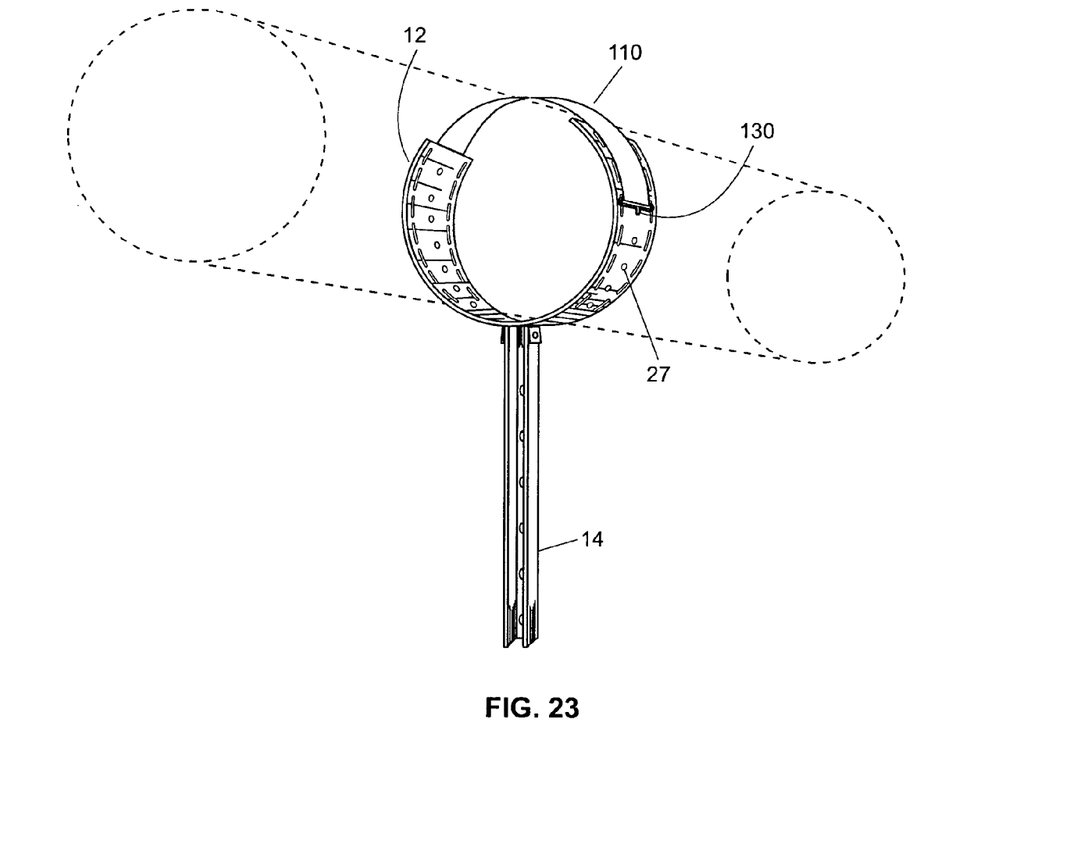
FIG. 23 is a perspective view illustrating position of the supporting strap on the arcuate position in the first embodiment of the present invention.
Figure 24:
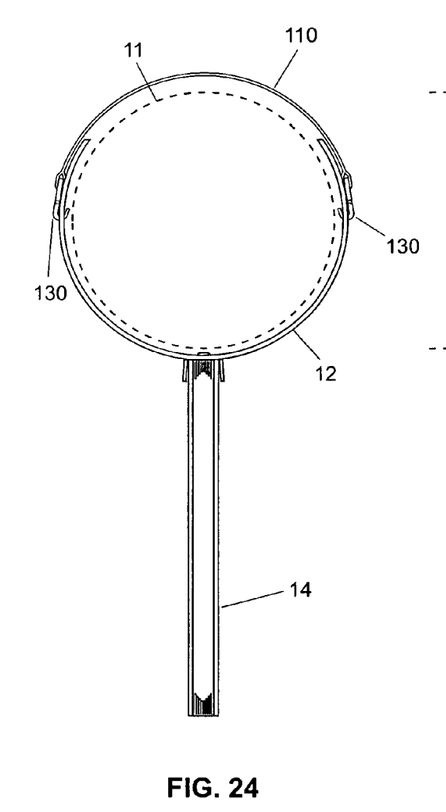
FIG. 24 is a front view of the air support unit of the first embodiment of the present invention, in use with the supporting strap.
Figure 25:
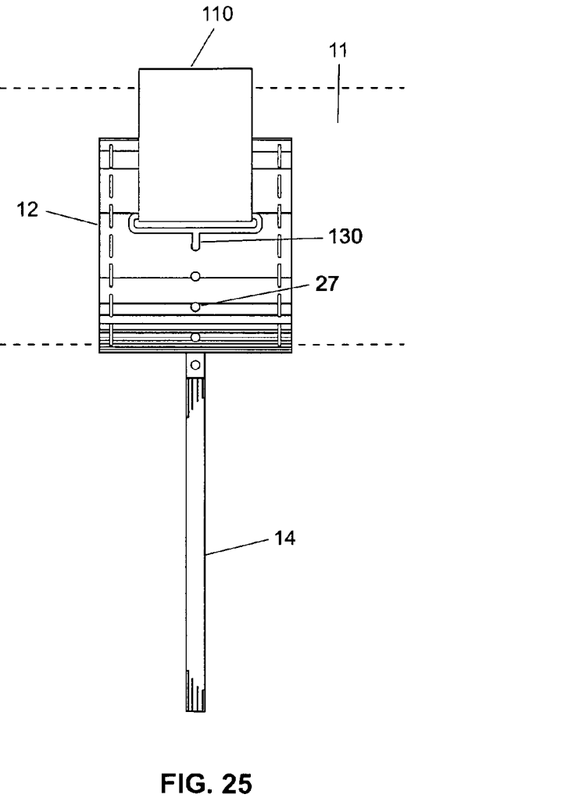
FIG. 25 is a side view of the air duct support unit of the first embodiment of the present invention, used with the supporting strap.
Figure 34:
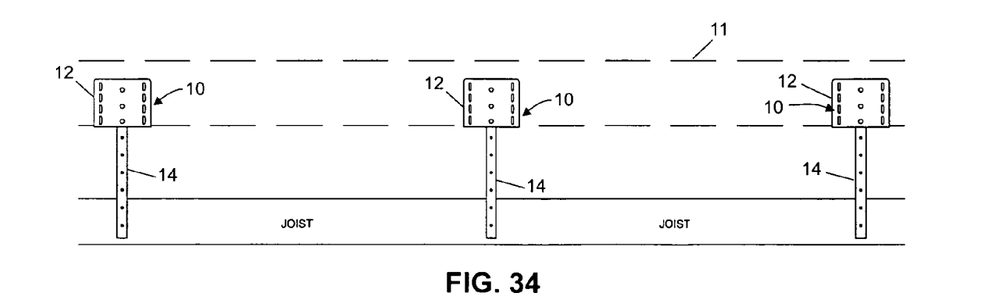
FIG. 34 is a schematic view illustrating a plurality of air duct support units of the present invention secured to a joist.

In operation, the user engages the hook 130 in one of the openings 27 and wraps the strap 110 around the duct 11, as shown in FIGS. 23-25. The user then secures the opposite end of the strap to the other side of the main body 12 by engaging the second hook 130 with the opening on the other side of the main body 12. The support device 10 can be used in an upright position, with the main body 12 being above the support member 14, as shown in FIG. 34, or suspended from a rafter, as shown in FIG. 33.

When suspended from a rafter 140, the main body 12 has the channel 16 open downwardly. In this application, the collar plate 70 or the strap 110 are preferably used to prevent the conduit 11 from slipping out of the main body 12. The support member 14 is secured to the rafter by screws, nails, or other suitable means. When extended upward from a joist, the main body 12 is positioned above the support member 14 and the opening of the channel 16 is oriented upwardly. The conduit 11 rests within the channel 16 without any assistance from a collar 70 or the strap 110. Still, the strap 110 may be used to reduce vibration, if desired. Where needed, the support units 10 may be used at about 4-5 feet intervals.

The second embodiment of the air duct support device of the present invention is shown in FIGS. 6-10 and 26-27. The second embodiment is generally designated by numeral 150. The air duct support device 150 comprises a main body 152 and a support member 154. The main body 152, similarly to the first embodiment, comprises an arcuate body defining an open channel 156 having an opening between opposing ends 153, 155. The main body 152 is provided with two parallel rows of spaced elongated notches 157, 159 and spaced openings 161 made between the rows of notches 157, 159. The notches 157, 159 are adapted to receive tabs of the collar plate 70, while the openings 161 are adapted to receive hooks 130 when the strap 110 is used.

Figure 6:
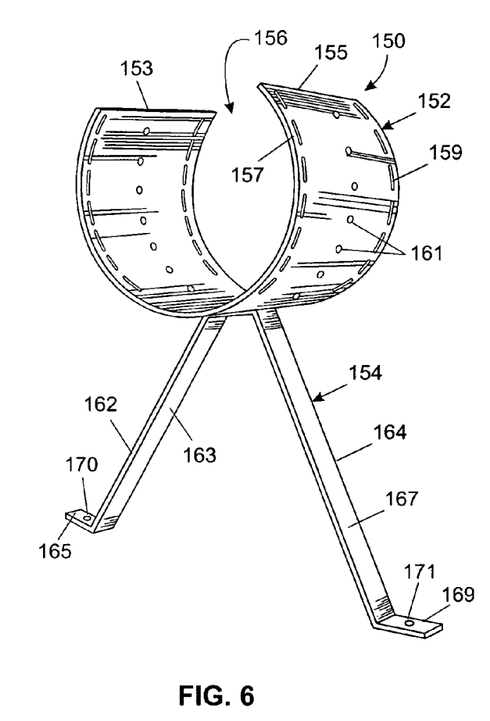
FIG. 6 is a perspective view of an air duct support in accordance with the second embodiment of present invention.
Figure 7:
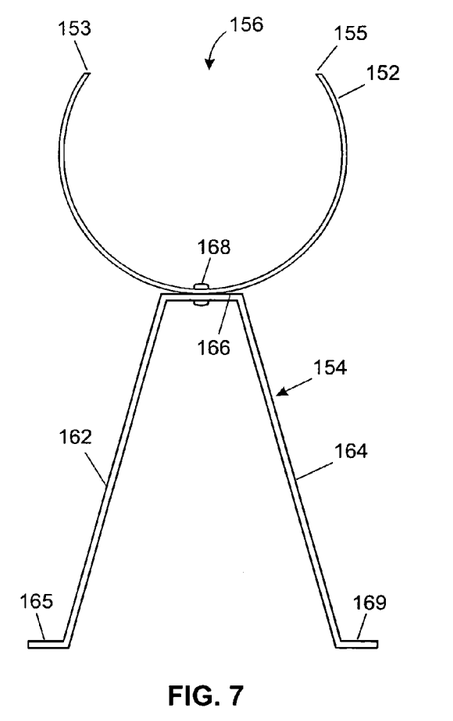
FIG. 7 is a front view of the duct holder of the second embodiment of the present invention.
Figure 8:
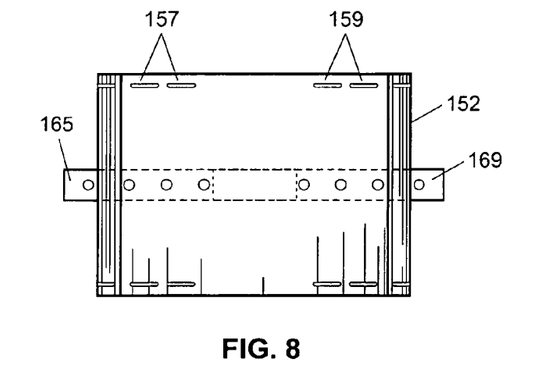
FIG. 8 is a top view of the duct support of the second embodiment of the present invention.
Figure 9:
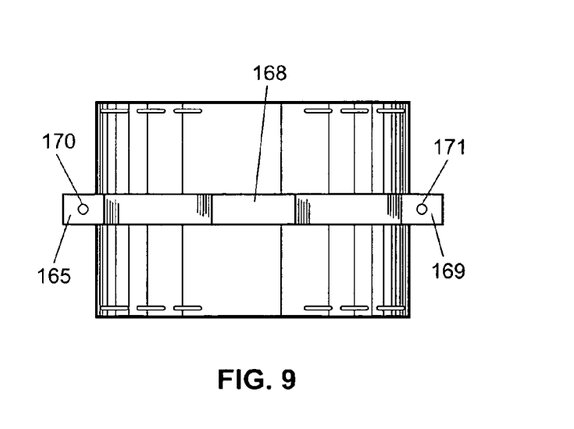
FIG. 9 is the bottom view of the duct holder of the second embodiment of the present invention.
Figure 10:
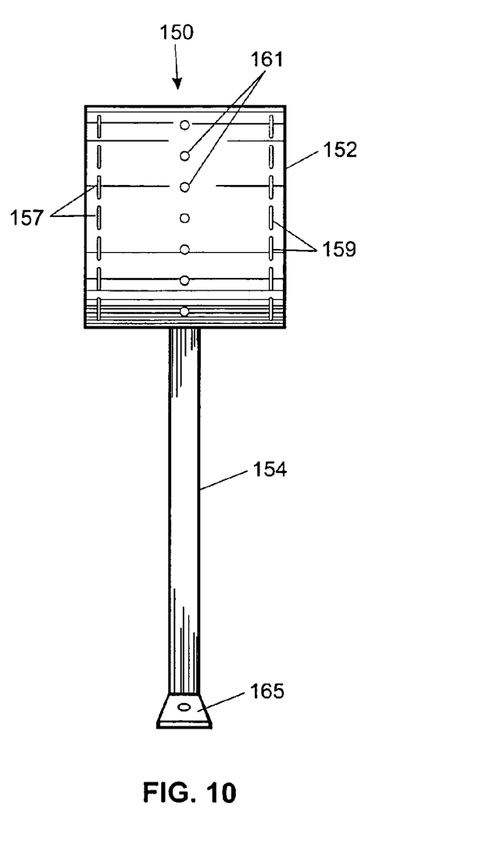
FIG. 10 is side view of the duct holder of the second embodiment of the present invention.

The support member 154, in this embodiment, comprises a pair of spread-apart legs 162, 164, which are oriented at an angle in relation to a central axis of the main body 152. The legs 162, 164 are connected by a bridge plate 166, which is secured to the main body 152 by a rivet 168. The rivet 168 allows free rotation of the main body 152 in relation to the support legs 162, 164, similar to the rotation of the main body 12 in relation to the upright support member 14. In both embodiments, the main body 12, 152 can be oriented to any desired position in relation to the support members to accommodate extension of the conduit 11.

The leg 162 comprises an elongated support plate 163 and a unitary formed attachment plate 165 extending at an obtuse angle in relation to the longitudinal axis of the support plate 163. The leg 164 comprises an elongated support plate 167 and a unitary attachment plate 169 secured at an obtuse angle to a longitudinal axis of the support plate 167. An opening 170 is formed in the attachment plate 165, and an opening 171 is formed in the attachment plate 169. The openings 170, 171 are adapted for receiving an attachment means therethrough, such as a screw, bolt, nail and the like, for securing the device 150 to a rafter or a joist.

Figure 26:
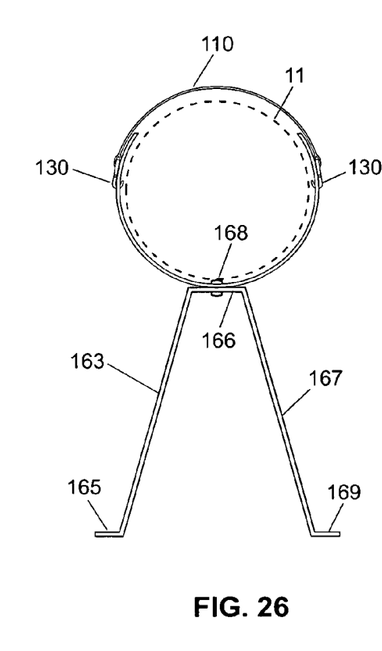
FIG. 26 is a front view of the air duct support unit of the second embodiment of the present invention, used with the supporting strap.
Figure 27:
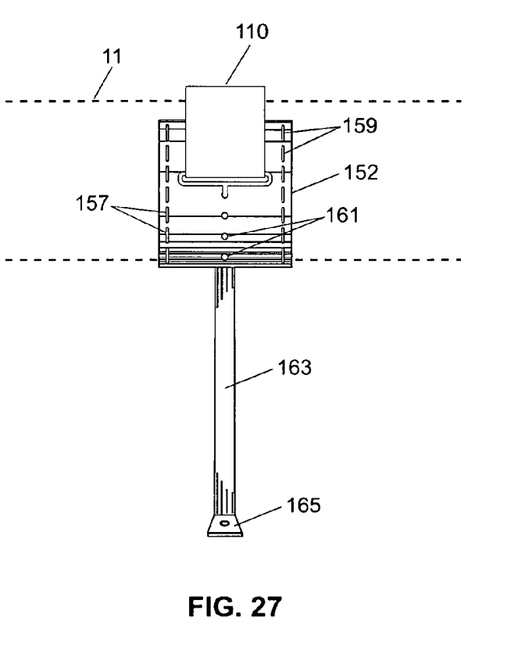
FIG. 27 is a side view of the air duct support unit of the second embodiment of the present invention, used with the supporting strap.

FIGS. 26 and 27 illustrate position of the conduit 11 in relation to the support device 150. As can be seen in the drawings, the conduit 11 rests within the channel 156 and a strap 110 is wrapped around the exposed portion of the conduit 11. The strap is engaged with the openings 161.

Construction regulations require that flexible or hard metal ducts be supported at defined intervals along their length and that sagging of the ducts between the supports not exceed more than 2½ inches. The present invention allows support of the air duct from the bottom without constricting the air flow, as is often the case with nylon straps, by allowing the flexible ducts or hard metal ducts to rest within the main body 12 or 152. As a result, the loss of airflow is minimized and greater efficiency of HVAC systems may be achieved. Additionally, the collection of moisture under the ducts is eliminated since the ducts are supported in an elevated position above the floor or insulation.

The main body 12 or 152 is rotatably attached to the respective support members 14, 154 by a rivet 36, 168, respectively, allowing the channel 16, 156 to be oriented in any desired direction where the air duct needs to be directed. The 360-degree rotation of the main body 12, 152 in relation to the support member 14, 154 allows the main body 12, 152 to be oriented in an infinite number of angles in relation to the central axis of the support member 14, 154. As result considerable flexibility in positioning of the support device 10, 150 on any available structural member is achieved.

The projecting ends 15, 17 of the main body 12 and ends 153, 155 of the main body 152 extend at a sufficient distance from the bottom of the channels 16, 156 and from each other as to not constrict the airflow through the air duct 11 supported by the support device 10, 150. The device 10, 150 when properly installed can readily support the weight of a section of the air duct, be it a flexible air duct or a hard metal conduit.

It will be understood that the particular shapes of the main body 12, 152 and the support member 14, 154 are examplary and can be easily modified depending on the requirements of the job. For instance, the main body 12 may be formed as a three-sided body forming a rectangular channel for accommodating an air duct or other conduit. The support member 14 may have an I-shaped cross-section; it may be a solid rectangle, cylinder and the like.

Many other changes and modifications may be made in the design of the present invention without departing from the spirit thereof. I therefore pray that my rights to the present invention be limited only by the scope of the appended claims.

I claim:

1. A conduit support device, comprising:
    a main body having opposing ends and a bottom defining an opening channel to form a U-shaped configuration, said channel being sized and shaped for receiving a portion of the conduit therein, said main body being provided with a plurality of spaced openings located centrally and spaced equidistantly along the curvature of the main body;
    an upright support member having a top portion for supporting the main body and a lower portion, being configured for securing to a structural member, and wherein said main body is freely rotatable in relation to the top portion of the support member about a horizontal axis; and
    a retaining member for positioning about portion of the conduit outside of the channel, said retaining member being detachably securable to said main body, said retaining member comprising a flexible generally planar strap having two opposing ends with folded ends, at least two hook members positioned in said folded ends by an attachment part, said each hook member having a hook portion that engages the spaded opening in the main body to secure the opposing ends of the training member to said main body.

2. The device of claim 1, wherein said support member comprises an upright member having a generally U-shaped configuration, said upright member comprising a main wall and a pair of parallel side walls.

3. The device of claim 1, wherein the main body being positioned above the upright support member.

4. The device of claim 1, wherein said main body has a generally arcuate configuration to accommodate cylindrical conduits positioned therein.

5. A support device for an air duct conduit, comprising:
    a generally arcuate main body having opposing ends and a bottom defining an opening channel to form a U-shaped configuration, said channel being sized and shaped for receiving a portion of the air duct conduit therein, said main body being provided with a plurality of spaced openings located centrally and spaced equidistantly along the curvature of the main body;
    an upright support member secured to the main body, said upright support member being configured for securing to a structural member so as to support the main body and the air duct conduit in an elevated position in relation to a base surface, said upright support member having a top portion for supporting the main body and a lower portion being configured for securing to a structural member, and wherein said main body is freely rotatable in relation to the top portion of the support member about a horizontal axis; and
    a retaining member for positioning about portion of the conduit outside of the channel, said retaining member being detachably securable to said main body, said retaining member comprising a flexible generally planar strap having two opposing ends with folded ends, at least two hook members positioned in said folded ends by an attachment part, said each hook member having a hook portion that engages the spaded opening in the main body to secure the opposing ends of the training member to said main body.

* * * * *